United States Patent
Zhang et al.

(10) Patent No.: US 11,520,634 B2
(45) Date of Patent: Dec. 6, 2022

(54) REQUIREMENT-BASED RESOURCE SHARING IN COMPUTING ENVIRONMENT

(71) Applicant: KYNDRYL, INC., New York, NY (US)

(72) Inventors: Yi Qun Zhang, Shanghai (CN); Ping G P Cao, Shanghai (CN); Xu Lei X L Zhou, Shanghai (CN); Jian Dong Yin, Beijing (CN); Li Long Chen, Bejing (CN)

(73) Assignee: Kyndryl, Inc., New York, NY (US)

( * ) Notice: Subject to any disclaimer, the term of this patent is extended or adjusted under 35 U.S.C. 154(b) by 467 days.

(21) Appl. No.: 16/448,818

(22) Filed: Jun. 21, 2019

(65) Prior Publication Data

US 2020/0401449 A1 Dec. 24, 2020

(51) Int. Cl.
*G06F 9/50* (2006.01)

(52) U.S. Cl.
CPC .................... *G06F 9/505* (2013.01)

(58) Field of Classification Search
CPC ............. G06F 9/505; G06F 2209/5019; G06F 2209/5011; G06F 9/5072
See application file for complete search history.

(56) References Cited

U.S. PATENT DOCUMENTS

| 8,037,187 | B2 | 10/2011 | Dawson |
| 9,009,294 | B2 | 4/2015 | Dawson |
| 9,274,850 | B2 | 3/2016 | Gohad |
| 2009/0210527 | A1* | 8/2009 | Kawato ............... G06F 9/45558 718/1 |
| 2011/0302578 | A1* | 12/2011 | Isci ....................... G06F 9/5077 718/1 |

(Continued)

FOREIGN PATENT DOCUMENTS

CN 101938416 B 8/2012

OTHER PUBLICATIONS

Wu, "SLA-Based Resource Provisioning for Management of Cloud-Based Software-As-A-Service Applications", 194 pps., Mar. 2014, <https://minerva-access.unimelb.edu.au/bitstream/handle/11343/41013/SLACloud- Thesis-Aug2014.pdf?sequence=3&isAllowed=y>.

(Continued)

*Primary Examiner* — Benjamin C Wu
(74) *Attorney, Agent, or Firm* — John Kennel; George S. Blasiak; Heslin Rothenberg Farley & Mesiti PC

(57) ABSTRACT

Embodiments of the present disclosure relate to requirement-based resource sharing in a computing environment. In an embodiment, a computer-implemented method is disclosed. According to the method, it is determined whether a plurality of services to be provisioned in a computing environment match with each other in resource consumption based on respective resource requirements of the plurality of services. In response to determining that the plurality of services match with each other, a resource pool is allocated in the computing environment to be shared by the plurality of services. The resource pool has a resource quota determined based on at least one of the resource requirements. The plurality of services is caused to be provisioned in the computing environment using the resource pool. In other embodiments, a computer system and a computer program product are disclosed.

19 Claims, 6 Drawing Sheets

(56) References Cited

U.S. PATENT DOCUMENTS

| | | | |
|---|---|---|---|
| 2011/0307901 A1* | 12/2011 | Blanding | G06F 11/3442 |
| | | | 703/21 |
| 2014/0282520 A1* | 9/2014 | Sabharwal | G06F 9/45558 |
| | | | 718/1 |
| 2014/0282536 A1 | 9/2014 | Dave et al. | |
| 2014/0351440 A1 | 11/2014 | Madani | |
| 2014/0373010 A1* | 12/2014 | Folco | G06F 9/45533 |
| | | | 718/1 |
| 2015/0339158 A1* | 11/2015 | Harris | G06F 9/50 |
| | | | 718/103 |
| 2017/0163764 A1 | 6/2017 | Allen | |
| 2017/0278087 A1* | 9/2017 | Beda, III | H04L 43/0817 |
| 2018/0024860 A1* | 1/2018 | Balle | G06F 1/20 |
| | | | 718/104 |
| 2019/0196878 A1* | 6/2019 | Li | H04L 41/0806 |

OTHER PUBLICATIONS

Mell et al., "The NIST Definition of Cloud Computing", National Institute of Standards of Technology, US Department of Commerce, NIST Special Publication 800-145, Sep. 2011, 7 pages.

\* cited by examiner

REQUIREMENT-BASED RESOURCE SHARING IN COMPUTING ENVIRONMENT

BACKGROUND

The present invention relates to the field of computer resource sharing, and more specifically to requirement-based resource sharing in a computing environment.

A computing environment, especially a cloud computing environment, is becoming an innovative computing paradigm. It provides reliable, customized, and guaranteed computing infrastructures for users. The concept of cloud computing refers to the use of computing capabilities of machines provided by more than one provider center around the world. Linked by a network, these machines provide resources, such as physical or logical compute engines, servers and devices, memories, storage devices, network bandwidth, that may be invoked to instantiate a virtual machine or other processes for a limited or defined duration. The users can request resources in the computing environment for deployment of services they desire and running workloads of the deployed services.

SUMMARY

Aspects of an embodiment of the present invention disclose a method, computer program product, and computer system for requirement-based resource sharing in a computing environment. It is determined whether a plurality of services to be provisioned in a computing environment match with each other in resource consumption based on respective resource requirements of the plurality of services. In response to determining that the plurality of services match with each other, a resource pool is allocated in the computing environment to be shared by the plurality of services. The resource pool has a resource quota determined based on at least one of the resource requirements. The plurality of services is caused to be provisioned in the computing environment using the resource pool.

DETAILED DESCRIPTION

Figure 1:
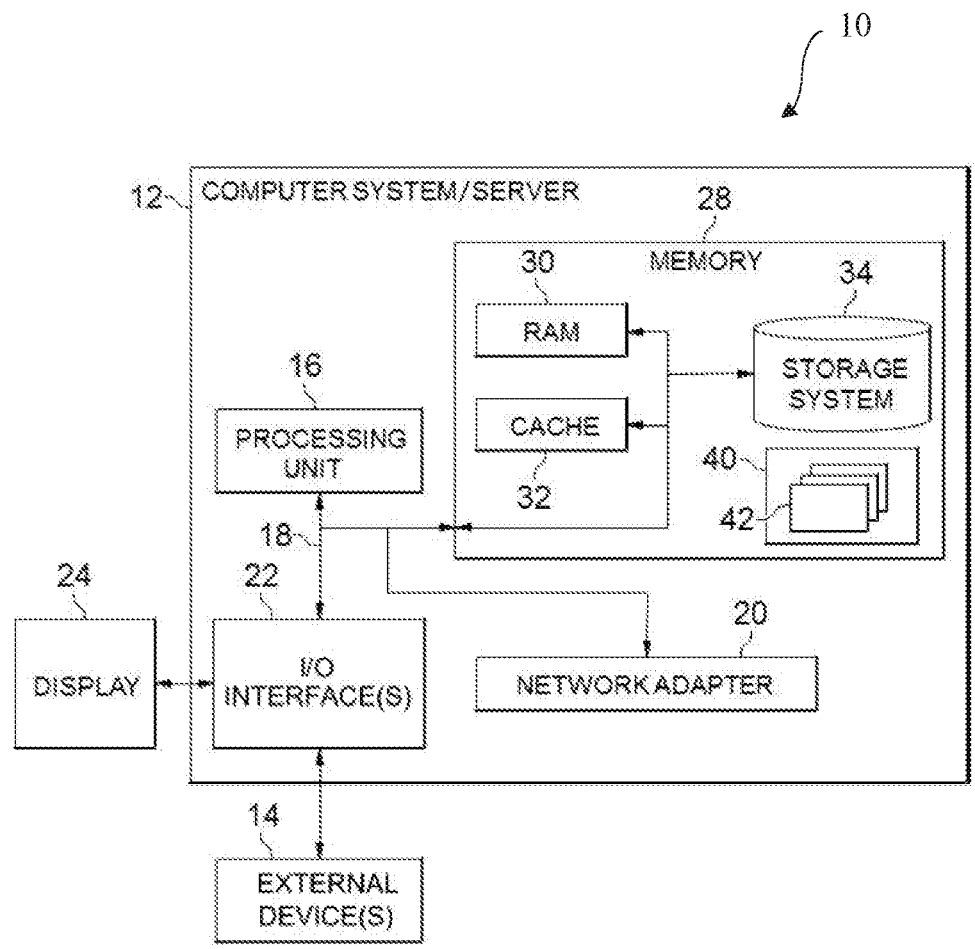
FIG. 1 depicts a block diagram of a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
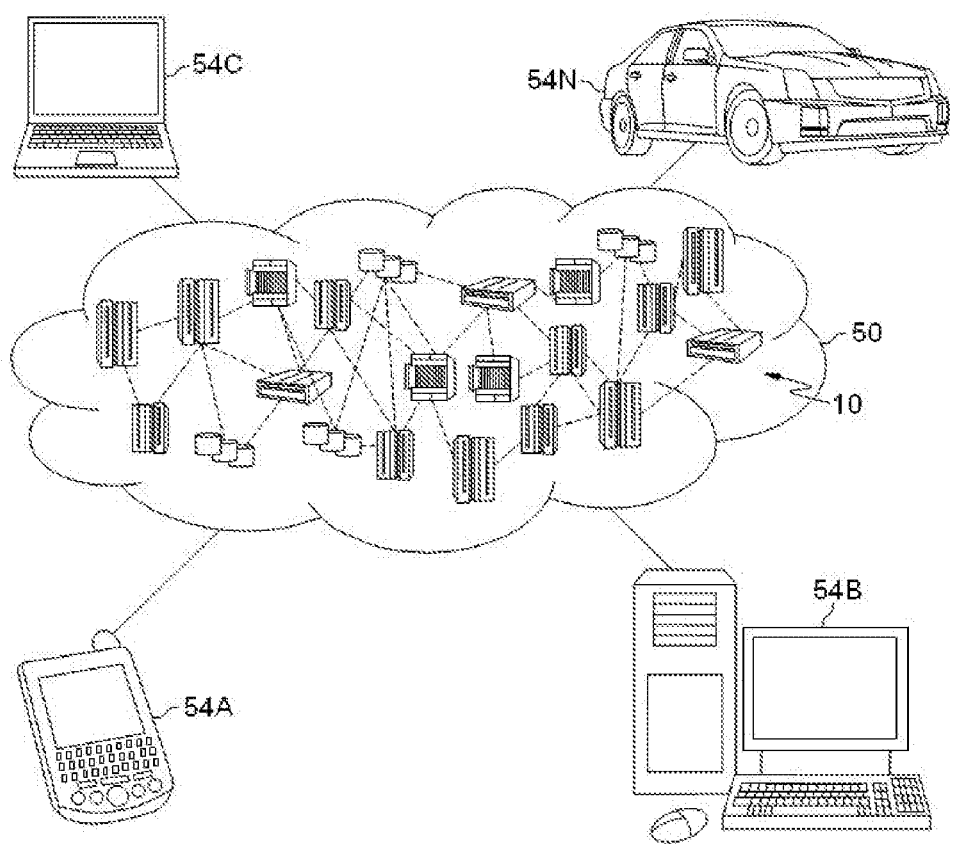
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
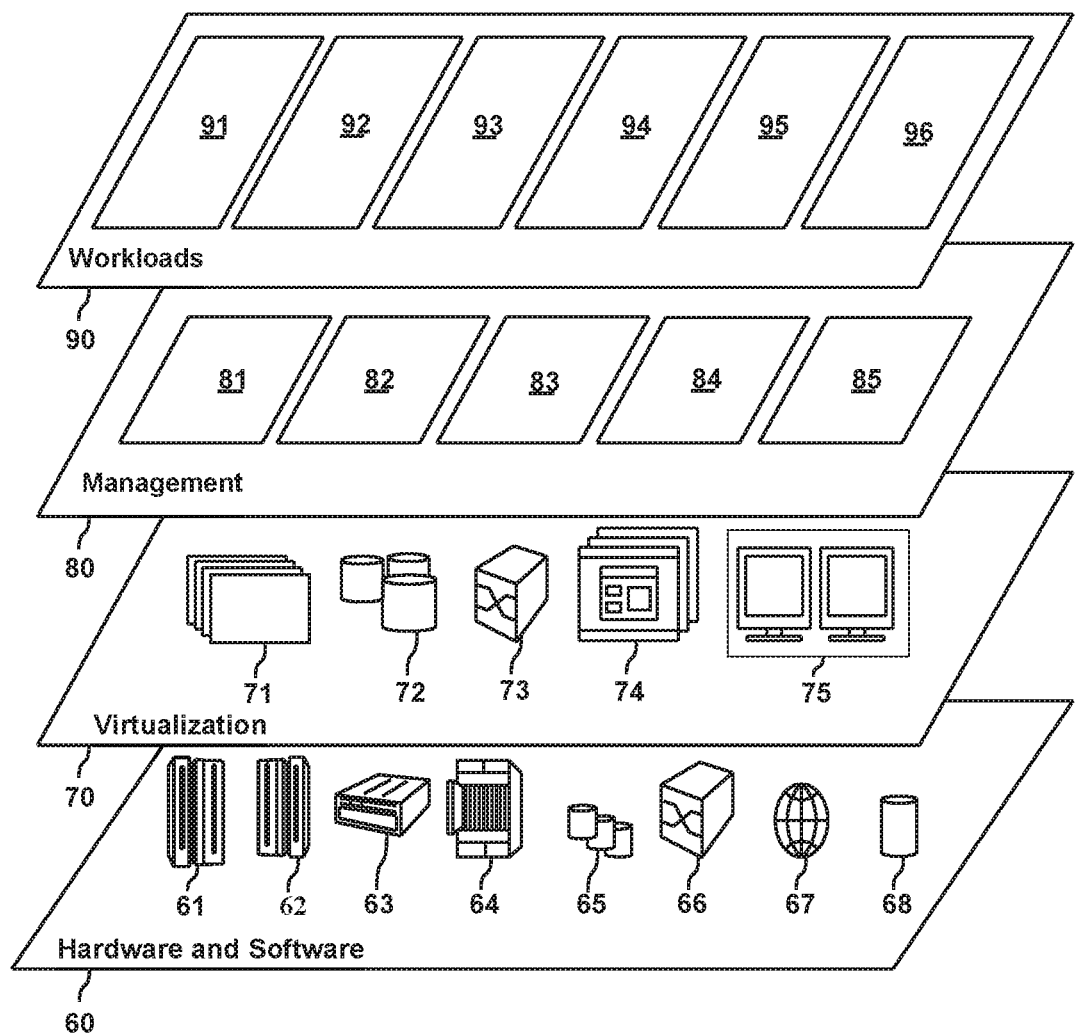
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resource coordination 96.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Service consumers of a computing environment, such as a large-scale cloud computing environment, have differing needs and expectations regarding resources for service deployment. These resources may include such things as physical or logical compute engines, servers and devices, memories, storage devices, network bandwidth, and the like. The resources will be allocated to the consumers for service deployment and the consumers may usually have to pay for the resource consumption. The cost may increase as the resource capacity required increases.

Conventionally, a resource capacity capable of handling peak demand or critical requirements of a service will be allocated to a service in order to avoid disruptive or undesirable consequences. For example, if a service may require up to 32 virtual central processing units (CPUs) to perform the workload in rush hours, then 32 virtual CPUs will be allocated to this service. Consequently, many CPUs may not be fully utilized most of the time. Such resource allocation may lead to low resource utilization and a cost increase for the service consumer.

According to embodiments of the present invention, there is proposed a solution for requirement-based resource sharing in a computing environment. According to this solution, a plurality of services can share a same resource pool in a computing environment if these services are determined to match with each other in resource consumption based on their resource requirement. This resource pool is allocated for the plurality of services to deploy therefrom. This solution provides a more flexible way of service provisioning. It improves resource utilization and reduces waste by sharing the resources across different services. It can also help save costs by the service consumers on the resources and costs by the service providers on maintenance and operation of the computing platform.

Figure 4:
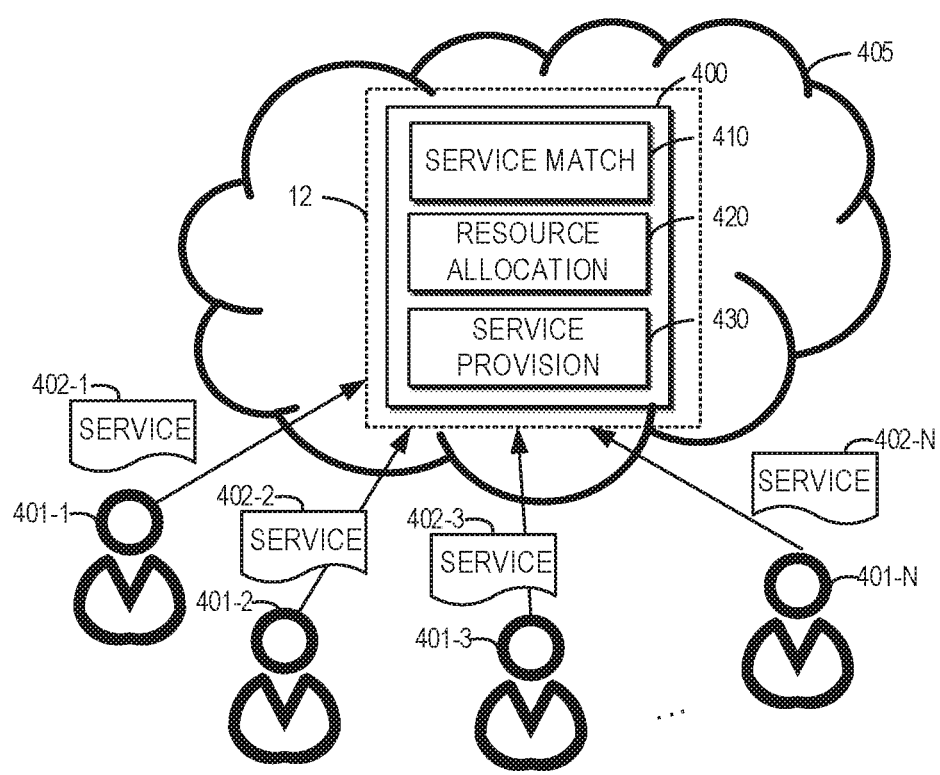
FIG. 4 depicts a block diagram of a system for resource sharing across services according to an embodiment of the present invention.

The resource sharing will now be described in detail below. Reference is now made to FIG. 4, which illustrates a block diagram of a system 400 for resource sharing across services according to an embodiment of the present invention. FIG. 4 depicts an example architecture in which embodiments of the present invention can be implemented, which involves a computing environment 405 and a computer system/server 12. It is understood that the teachings recited herein may be practiced within any type of computing environment, such as the cloud computing environment 50 of FIG. 2. The stand-alone computer system/server 12 is shown in FIG. 4 for illustrative purposes only.

The system 400 is shown within the computer system/server 12. In general, the system 400 can be implemented as program/utility 40 on the computer system 12 of FIG. 1 and can enable the functionalities recited herein. In some embodiments, the functionalities of the system 400 may be implemented in a distributed manner across a plurality of computer devices/servers.

It is further understood that the system 400 may be incorporated within or work in conjunction with any type of system that receives, processes, and/or executes commands with respect to resources in a computing environment. Such other system(s) have not been shown in FIG. 4 for brevity purposes. Along these lines, the system 400 may perform multiple functions similar to a general-purpose computer. In some embodiments, some functionality described in some embodiments of the present invention with respect to the system 400 may be implemented in management layer 80 in the computing environment 405.

In the cloud computing environment 405, different consumers 401-1, 401-2, 401-3, . . . , 401-N may request resources in the computing environment 405 to deploy their services 402-1, 402-2, 402-3, . . . , 402-N, in which N may be any integer larger than one. For purpose of description, consumers 401-1, 401-2, 401-3, . . . , 401-N may be collectively or individually referred to as consumers 401, and services 402-1, 402-2, 402-3, . . . , 402-N may be collectively or individually referred to as services 402. It would be appreciated that although not shown, in some cases the same consumer may request to deploy more than one service.

As used herein, a consumer of a computing environment may also be referred to as a service consumer (or a cloud service consumer in a cloud computing environment). The consumer may manage users and access control through role assignments; set spending limits and purchase orders; undertake cloud architecture and solution design; access and use provisioned resources; receive monthly bills; review bills and details through portal; pay bills; monitor performance using the performance dashboards/analytics for cost, capacity, and utilization, etc. As used herein, a provider or a service provider (or a cloud service provider in a cloud computing environment) refers to the entity that provides the requested services, the support for provisioned resources, and the monthly metering and billing; meets service-level agreements (SLAs) and provider terms; participates in critical problem triage and resolution processes; reviews and approves solution design; and the like. A consumer may be any entity that is a register user on a portal of the computing environment.

A service 402 to be provisioned in the computing environment 405 may typically require physical and/or virtual resources or hardware and/or software resources on a fee-for-service basis and onto which consumers may load and/or install, and manage platforms, applications, and/or data. In some embodiments, a service 402 may be in the form of IaaS or Container-as-a-Service (CaaS).

According to embodiments of the present invention, instead of directly allocating the required resources to individual services 402, the system 400 automatically groups two or more services 402 based on their resource requirements and allocates a resource pool in the computing environment 405 to be shared by the two or more services 402. As such, the total resource amount required for provisioning the services 402 may be reduced and resources in the resource pool may be efficiently utilized. In addition, the corresponding consumers 401 may pay less for their resource usage by means of sharing the resources. Generally, the more the services share the same resource pool, the higher the resource utilization is and the lower the costs the consumers are required to pay. This may be considered as a group-purchasing mode of resources in the computing environment.

To implement the resource sharing described herein, the system 400 includes a service match module 410, a resource allocation module 420, and a service provision module 430. The service match module 410 is configured to determine whether two or more services 402 to be provisioned in the computing environment 405 match with each other in resource consumption. The determination may be based on respective resource requirements of the services 402.

In some embodiments, resources required to provision a service 402 may include any type of physical and/or logical resources or hardware and/or software resources. The resources may generally be divided as processing resources, memory resources, storage resources, bandwidth resources, and the like, which can be provided by one or more physical or logical compute engines, one or more memories, operating systems (OS), storage, network devices, inter-connection devices, software and middleware, and the like. The computing environment 405 may include infrastructure to support the resources provided to the services 402.

Different services 402 may have their specific resource requirements, depending on service types, user preferences, and/or the like. The resource requirements may indicate resource types, resource capacities required for handling workloads, predictive peak load periods of the services 402 (during which the highest resource capacities are required to support the peak loads), and/or any other requirements on the resources. For example, a service 402 may require a a first type of operating system, eight-core processors, a memory capacity of 100 GigaByte (GB), 10 TeraByte (TB) storage, a certain type of file system, a requirement on network bandwidth, and/or the like. It would be appreciated that all the resources here are listed for purpose of illustration only.

In some embodiments, the resource requirements may be implicitly indicated by SLAs associated with the services 402. SLAs are often used between a service provider and a service consumer, which specify desired performance levels to be delivered and any penalties to be imposed when these desired performance levels are not met. For example, an SLA may specify that a total downtime of the service in one-year is cannot be lower than a threshold and/or a total online time of the service in one year must reach a threshold. The service provider can plan and allocate a set of resources for each service consumer to ensure that SLA requirements are fulfilled. This allocation may lead the service provider to conservatively provision the resources in order to adequately cover peak load periods of the services.

In some embodiments, the resource requirements may be provided by the consumers 401 to the system 400. For example, on or more consumers 401 may provide their desired resource types, capacities of some types of resources, predictive peak load periods, and the like to the system 400. In another example, one or more consumers 401 may simply provide the SLAs associated with the services 402 to be provisioned.

Alternatively, or in addition, the resource requirements of one or more services 402 are determined by the system 400 based on analysis of assistance information associated with the services 402. Such assistance information may include historical operational information of the services 402 (if any), the service types, the target users, and/or the like. For example, a service 402 for file archiving may correspond to a first SLA that requires a higher performance level in storage and a lower performance level in data processing during day time, while a service 402 for online shopping may correspond to a second SLA that requires a higher performance level in response times for workload related to user online payment. In addition, peak load periods can also be predicted from the historical operational information, the service types, and/or the target users. For example, the peak load periods may be determined though statistics of workload variations from the historical operational information.

Different service types and/or target users may also correspond to different peak load periods.

In determining whether two or more services 402 match with each other in resource consumption, the service match module 410 considers matching of the services 402 in peak load periods. More specifically, the service match module 410 determines predictive peak load periods of the services 402 based on the resource requirements of the services 402. As mentioned above, the predictive peak load periods may be indicated directly in the resource requirements by the consumers 401 or may be derived based on the service types if no explicit information on the peak load periods can be obtained. Any other suitable manners may be employed to determine the predictive peak load periods. The service match module 410 may determine the predictive peak load periods of all the requested services 402.

With the predictive peak load periods of the services 402 determined, the service match module 410 further determines whether the predictive peak load periods are staggered with each other. To be able to share the same resource pool, the services 402 should not contend resources with each other during peak load periods. For example, if a predictive peak load period of a first service is from about 9:00 am to 6:00 pm during weekdays, a predictive peak load period of a second service is from about 9:00 pm to 2:00 am every day, and a predictive peak load period of a third service is from about 8:00 am to 8:00 pm during weekend, then it is determined that the predictive peak load periods of the three services are staggered with each other because their peak load periods are not overlapped with each other.

If the service match module 410 determines that the predictive peak load periods of two or more services 402 are staggered with each other, the service match module 310 determines that these services 402 match with each other in resource consumption. Alternatively, or in addition, the service match module 410 may further determine the resource types of the services based on the resource requirements and then determine whether the resource types of the services 402 are compatible with each other. To be able to share the same resource pool, the resources in the resource pool should be utilized by all the services 402 grouped together. Thus, the services 402 requiring the same or compatible resource types can be considered as matching with each other in resource consumption.

In addition to the predicative peak load periods and/or the resource types, the service match module 410 determines that two or more services 402 match with each other based on a determination that the resource capacities for the services 402 are comparable with each other. The resource capacities may be determined from the resource requirements. In some embodiments, the service match module 410 may determine a predetermined maximum number of services to share the same resource pool.

If the service match module 410 determines that two or more services (such as the services 401-1, 401-2, 401-3) match with each other, the resource allocation module 420 is configured to allocate a resource pool in the computing environment 405 to be shared by the matching services 402.

Resources in the resource pool may include various resources that can support provisioning of the services including processing resources, memory resources, storage resources, bandwidth resources, and the like. In some embodiments, the resource pool may be allocated as a container, for example, in a container-based computing environment.

The resource pool has a resource quota determined based on a resource requirement of one or more of these matching services 402. In a specific example, the resource quota may be determined based on the resource requirement of one service 402. This is possible because these services are determined to match with each other in resource consumption. The resource quota of the resource pool may be lower than a sum of respective resource quotas determined based on individual resource requirements of the matching services 402.

For example, the resource pool may include specific resources types and resource capacities that meet the resource requirement(s) of one or more but not all matching services 402. In some cases, the resource quota may be determined based on the resource requirement that indicates a relatively higher resource quota, such as requirements on higher resource capacities, resource types supporting higher performance, and/or the like. As such, the resource pool is capable of provisioning the services 402 that might require relative lower resource quota. In some embodiments, the resource quota may be higher than the resource quota required by the strictest resource requirement among all the matching services 402 in order to provide some flexibility in dealing with possible concurrent peak loads occurring during the resource sharing of the services 402. It should be appreciated that the resource quota may be determined based on other resource allocation mechanisms applied in the computing environment 405.

In some embodiments, the resource allocation module 420 may verify if the services that match with each other are allowed for resource sharing, for example, by receiving confirmation from the corresponding consumers 401. As such, each consumer of the computing environment 405 has the option to decide whether or not to accept the resource sharing for its service. If the resource allocation module 402 determines that resource sharing for the matching services 402 are allowed, resource allocation module 402 allocates the resource pool for these services to share.

The service provision module 430 is configured to cause provisioning of the matching services 402 in the computing environment using the allocated resource pool. The resources in the resource pool may then be shared by the services 402 that match with each other to perform workloads of these services 402.

In some embodiments, the service provision module 430 may separate user data and computing resources of the matching services 402. Specifically, the service provision module 430 may initiate a plurality of separate micro-containers in the resource pool, each for one of the matching services 402. The micro-containers may be considered as separate interfaces for receiving workloads of the matching services 402 and separate storage spaces for maintaining user data of the matching services 402. The service provision module 430 may further cause coordination of resources in the resource pool across the workloads from the micro-containers. For example, the service provision module 430 may initiate a resource coordinator in the resource pool for the resource coordination during operation of the matching services 402.

Figure 5:
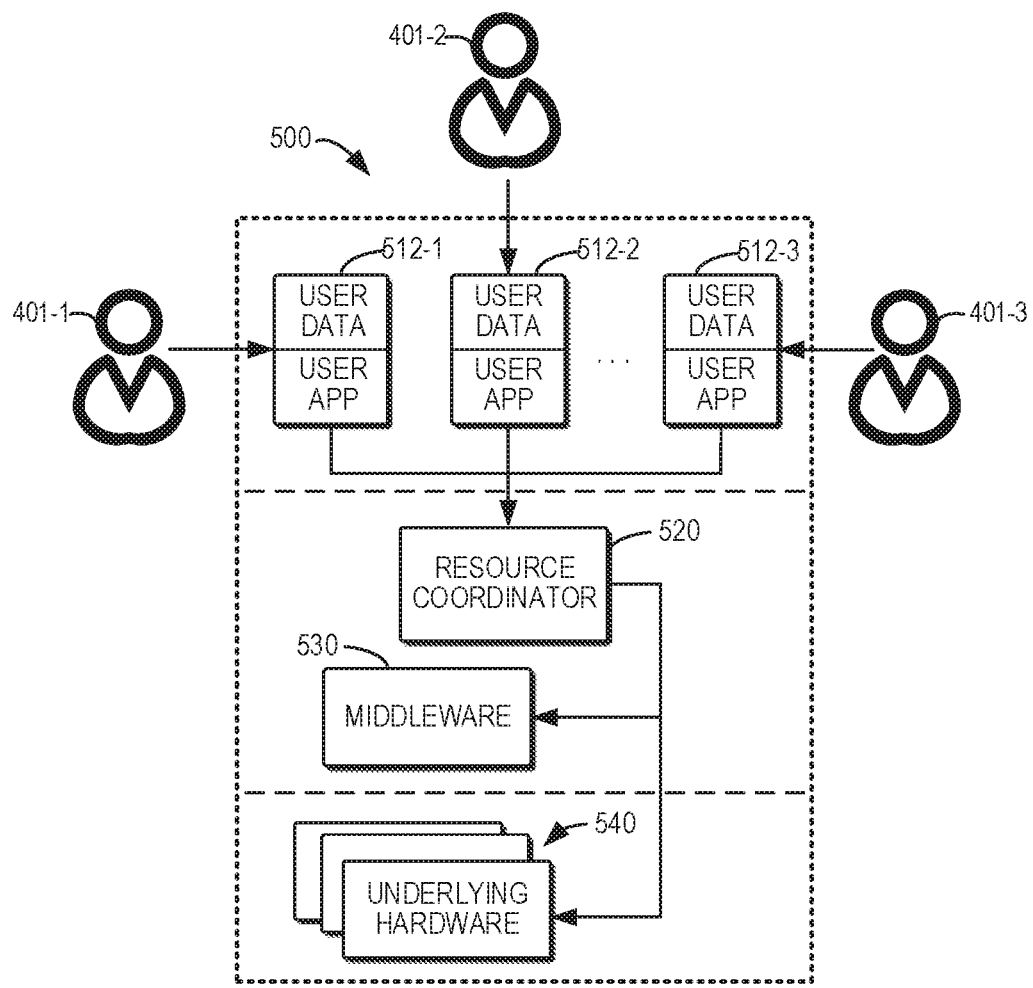
FIG. 5 depicts a deployment of services in a resource pool according to an embodiment of the present invention.

In some embodiments, the separation of user data and computing resources may be implemented as a hierarchical structural container. FIG. 5 illustrates such embodiments where the resource pool allocated for the matching services 402 is implemented as a hierarchical structural container 500. In this example, it is supposed that the services 402-1, 402-2, and 402-3 from the consumers 401-1, 401-2, and 401-3 are determined to match with each other in resource consumption. It should be appreciated that more, less, or different services may be determined to match with each other and be allocated the same resource pool for sharing.

As shown, a plurality of micro-containers 512-1, 512-2 and 512-3 are initiated by the service provision module 430 for the services 402-1, 402-2, and 402-3 from the consumers 401-1, 401-2, and 401-3, respectively. As such, the consumers 401-1, 401-2, and 401-3 may send inputs related to the services 402-1, 402-2, and 402-3 to the micro-containers 512-1, 512-2 and 512-3. The micro-containers 512-1, 512-2 and 512-3 may maintain corresponding user data and possibly user applications to be executed as required by the consumers 401-1, 401-2, and 401-3.

The hierarchical structural container 500 further includes a resource coordinator 520 that is initiated by the service provision module 430 for coordinating resources to perform workloads from the micro-containers 512-1, 512-2 and 512-3. For purpose of illustrations, the resources coordinated by the resource coordinator 520 may include middleware 530 and various underlying hardware 540 including core operating system, memories, storage, network devices, inter-connection devices, and/or the like.

After the matching services 402 are provisioned and running in the resource pool, the costs of the services 402 may be determined based on actual resource usage by workloads of the services in the resource pool. The system 400 may include a module (not shown) for cost tracking as the resources are consumed by the services 402. As such, the services 402 may be charged in a reasonable manner according to their actual usage and the consumers 401 may need to pay less as compared with "dedicated resources" allocated for their services. In some embodiments, in addition to the dynamic costs depending on the actual resource usage, the costs of the services 402 may be determined further based on a predetermined cost for infrastructure supporting the resource pool (which is a basic fee).

In some other embodiments, the costs of the matching services 402 may also be fixed, which may be prescribed when the consumers 401 decide to join the resource sharing. The costs may be equal across all the matching services 402 or may be different depending on the varied predicative resource consumptions of the services and/or based on any other policies. The scope of the present invention is not limited in this regard.

Figure 6:
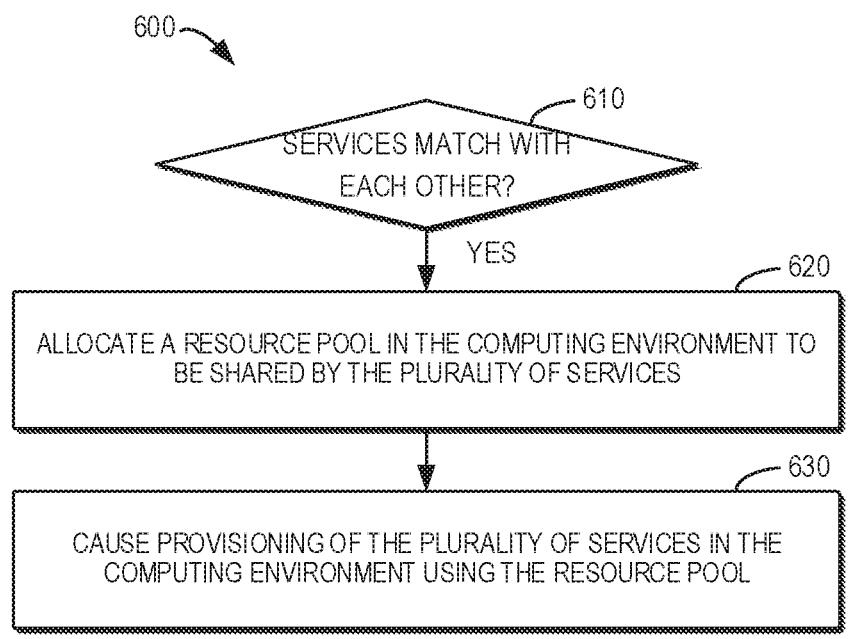
FIG. 6 depicts a flowchart of a method according to an embodiment of the present invention.

FIG. 6 shows a flowchart of a method 600 according to an embodiment of the present disclosure. The method 600 can be implemented on a system 400 within a computer system/server 12 as shown in FIG. 4. For the purpose of discussion, the method 600 will be described from the perspective of the system 400 with reference to FIG. 4.

At block 610, the system 400 determines whether a plurality of services to be provisioned in a computing environment match with each other in resource consumption based on respective resource requirements of the plurality of services. At block 620, in response to determining that the plurality of services match with each other, the system 400 allocates a resource pool in the computing environment to be shared by the plurality of services, wherein the resource pool haves a resource quota determined based on at least one of the resource requirements. At block 630, the system 400 causes provisioning of the plurality of services in the computing environment using the resource pool.

In some embodiments, the system 400 determines whether the plurality of services match with each other by determining respective predictive peak load periods of the plurality of services based on the respective resource requirements and determining that the plurality of services match with each other based at least in part on a determination that the respective predictive peak load periods are staggered with each other.

In some embodiments, the system 400 determines whether the plurality of services match with each other by determining respective resource types to be used by the plurality of services based on the respective resource requirements and determining that the plurality of services match with each other based at least in part on a determination that the respective resource types are compatible with each other.

In some embodiments, the system 400 causes provisioning of the plurality of services by initiating a plurality of separate micro-containers in the resource pool for receiving workloads and maintaining user data of the plurality of services, and by causing coordination of resources in the resource pool across the workloads from the plurality of micro-containers.

In some embodiments, the system 400 determines a cost of one of the plurality of services based at least in part on actual resource usage by a workload of the service in the resource pool.

In some embodiments, the system 400 determines the cost charge by determining the cost of the service further based on a predetermined cost charge for infrastructure supporting the resource pool.

In some embodiments, the system 400 comprises a cloud computing environment.

In some embodiments, the system 400 allocates the resource pool by, in response to determining that the plurality of services match with each other, determining whether resource sharing for the plurality of services are allowed and, in response to determining that the resource sharing is allowed, allocating the resource pool.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    determining, by one or more processors, whether a plurality of services to be provisioned in a computing environment match with each other in resource consumption based on respective resource requirements of the plurality of services;
    in response to determining that the plurality of services match with each other, allocating, by one or more processors, a resource pool in the computing environment to be shared by the plurality of services, wherein the resource pool has a resource quota determined based on at least one of the resource requirements; and
    causing, by one or more processors, provisioning of the plurality of services in the computing environment using the resource pool, wherein the causing includes causing coordination of resources in the resource pool across workloads from a plurality of micro-containers in the resource pool.

2. The method of claim 1, wherein determining whether the plurality of services match with each other comprises:
    determining, by one or more processors, respective predictive peak load periods of the plurality of services based on the respective resource requirements; and determining, by one or more processors, that the plurality of services match with each other based at least in part on a determination that the respective predictive peak load periods are staggered with each other.

3. The method of claim 1, wherein determining whether the plurality of services match with each other comprises:
determining, by one or more processors, respective resource types to be used by the plurality of services based on the respective resource requirements; and
determining, by one or more processors, that the plurality of services match with each other based at least in part on a determination that the respective resource types are compatible with each other.

4. The method of claim 1, wherein causing provisioning of the plurality of services comprises:
initiating, by one or more processors, a plurality of separate micro-containers in the resource pool for receiving workloads and maintaining user data of the plurality of services.

5. The method of claim 1, further comprising:
determining, by one or more processors, a cost of a first service of the plurality of services based, at least in part, on actual resource usage by a workload of the first service in the resource pool.

6. The method of claim 5, wherein determining the cost of the first service is further based on a predetermined cost charge for infrastructure supporting the resource pool.

7. The method of claim 1, wherein the computing environment comprises a cloud computing environment.

8. The method of claim 1, wherein allocating the resource pool comprises:
in response to determining that the plurality of services match with each other, determining, by one or more processors, whether resource sharing for the plurality of services is allowed; and
in response to determining that the resource sharing is allowed, allocating, by one or more processors, the resource pool.

9. The method of claim 1, wherein the resource quota of the resource pool is lower than a sum of respective resource quotas of the plurality of services.

10. The method of claim 1, wherein the resource pool is allocated as a container in a container based computing environment.

11. The method of claim 1, wherein a first service of the plurality of services is for file archiving, and wherein a second service of the plurality of services is for online shopping.

12. A computer system comprising:
one or more computer processors;
one or more computer readable storage media; and
program instructions stored on the computer readable storage media for execution by at least one of the one or more processors, the program instructions comprising:
program instructions to determine whether a plurality of services to be provisioned in a computing environment match with each other in resource consumption based on respective resource requirements of the plurality of services;
in response to determining that the plurality of services match with each other, program instructions to allocate a resource pool in the computing environment to be shared by the plurality of services, wherein the resource pool has a resource quota determined based on at least one of the resource requirements; and
program instructions to cause provisioning of the plurality of services in the computing environment using the resource pool, wherein the program instructions to cause include program instructions to cause coordination of resources in the resource pool across workloads from a plurality of micro-containers in the resource pool.

13. A computer-implemented method, comprising:
determining, by one or more processors, whether a plurality of services to be provisioned in a computing environment match with each other in resource consumption based on respective resource requirements of the plurality of services;
in response to determining that the plurality of services match with each other, allocating, by one or more processors, a resource pool in the computing environment to be shared by the plurality of services, wherein the resource pool has a resource quota determined based on at least one of the resource requirements, wherein the allocating comprises, in response to determining that the plurality of services match with each other, determining, whether resource sharing for the plurality of services is allowed, and in response to determining that the resource sharing is allowed, allocating the resource pool; and
causing, by one or more processors, provisioning of the plurality of services in the computing environment using the resource pool.

14. The method of claim 13, wherein determining whether the plurality of services match with each other comprises:
determining, by one or more processors, respective predictive peak load periods of the plurality of services based on the respective resource requirements; and
determining, by one or more processors, that the plurality of services match with each other based at least in part on a determination that the respective predictive peak load periods are staggered with each other.

15. The method of claim 13, wherein determining whether the plurality of services match with each other comprises:
determining, by one or more processors, respective resource types to be used by the plurality of services based on the respective resource requirements; and
determining, by one or more processors, that the plurality of services match with each other based at least in part on a determination that the respective resource types are compatible with each other.

16. The method of claim 13, wherein causing provisioning of the plurality of services comprises:
initiating, by one or more processors, a plurality of separate micro-containers in the resource pool for receiving workloads and maintaining user data of the plurality of services; and
causing, by one or more processors, coordination of resources in the resource pool across the workloads from the plurality of separate micro-containers.

17. The method of claim 13, further comprising:
determining, by one or more processors, a cost of a first service of the plurality of services based, at least in part, on actual resource usage by a workload of the first service in the resource pool.

18. The method of claim 13, wherein the resource quota of the resource pool is lower than a sum of respective resource quotas of the plurality of services.

19. The method of claim 13, wherein the resource pool is allocated as a container in a container based computing environment.

* * * * *